United States Patent
Hutchison et al.

(10) Patent No.: US 6,578,055 B1
(45) Date of Patent: Jun. 10, 2003

(54) METHODS, SYSTEM AND COMPUTER PROGRAM PRODUCTS FOR MIRRORED FILE ACCESS THROUGH ASSUMING A PRIVILEGED USER LEVEL

(75) Inventors: Robert Brian Hutchison, Raleigh, NC (US); Joel Mark Yarborough, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 09/587,688

(22) Filed: Jun. 5, 2000

(51) Int. Cl.⁷ .............................................. G06F 17/30
(52) U.S. Cl. .................. 707/204; 707/9; 705/3; 711/4; 711/170; 714/6
(58) Field of Search .................. 705/3; 711/4, 170; 714/6; 707/9, 204

(56) References Cited

U.S. PATENT DOCUMENTS

| | | | |
|---|---|---|---|
| 4,447,874 A | 5/1984 | Bradley et al. | 364/200 |
| 5,263,165 A | 11/1993 | Janis | 395/725 |
| 5,305,440 A | 4/1994 | Morgan et al. | 395/200 |
| 5,448,718 A * | 9/1995 | Cohn et al. | 711/4 |
| 5,537,533 A | 7/1996 | Staheli et al. | 395/182.03 |
| 5,619,657 A | 4/1997 | Sudama et al. | 395/200.06 |
| 5,649,099 A | 7/1997 | Theimer et al. | 395/187.01 |
| 5,799,141 A | 8/1998 | Galipeau et al. | 395/182.11 |
| 5,875,296 A | 2/1999 | Shi et al. | 395/188.01 |
| 5,918,228 A | 6/1999 | Rich et al. | 707/10 |
| 5,991,731 A * | 11/1999 | Colon et al. | 705/3 |
| 6,226,725 B1 * | 5/2001 | Yarborough | 711/170 |
| 6,324,654 B1 * | 11/2001 | Wahl et al. | 714/6 |

* cited by examiner

Primary Examiner—Charles L. Rones
(74) Attorney, Agent, or Firm—J. Bruce Schelkopf

(57) ABSTRACT

Methods, systems and computer program products are provided which access files which are mirrored between at least a first storage device and a second storage device by determining if an access of the first storage device is by a process for mirroring files between the first storage device and the second storage device and assuming a privileged user level for the process for mirroring files so that the access to the first storage device is performed at the privileged user level if the access is by the process for mirroring files. By assuming a privileged user level, the process for mirroring files may have access to the files to mirror, preferably, irrespective of the permissions assigned to a file by the owner of a file.

35 Claims, 5 Drawing Sheets

METHODS, SYSTEM AND COMPUTER PROGRAM PRODUCTS FOR MIRRORED FILE ACCESS THROUGH ASSUMING A PRIVILEGED USER LEVEL

RELATED APPLICATIONS

The present application is related to commonly assigned and concurrently filed U.S. Pat. No. 6,457,022, entitled "METHODS, SYSTEMS AND COMPUTER PROGRAM PRODUCTS FOR MIRRORED FILE ACCESS THROUGH FORCED PERMISSIONS", issued Sep. 24, 2002, and U.S. patent application Ser. No. 09/587,690, entiltled "METHODS, SYSTEMS AND COMPUTER PROGRAM PRODUCTS FOR MIRRORED FILE ACCESS THROUGH CONTROLLED ACL MODIFICATION", filed Jun. 5, 2000, the disclosures of which are incorporated herein by reference as if set forth fully herein.

FILED OF THE INVENTION

The present invention relates to file systems and more particularly to mirroring files between at least two storage devices.

BACKGROUND OF THE INVENTION

In many applications of data storage systems, reliability and availability are critical performance issues. For example, in a retail solution, availability of a data processing system to process retail transactions may be essential. In such systems where reliability and availability are critical performance issues, mirroring of storage devices, such as hard drives or the like, may be beneficial. Mirroring storage devices may be carried out by replicating files on one storage device onto another storage device.

As an example of a mirrored file system, the 4690 Point-of-Sale operating system available from International Business Machines Corporation of Armonk, N.Y., provided a proprietary operating system for the retail environment. File mirroring operations could be provided in such a proprietary operating system by providing a file mirroring kernel which performed the mirroring operations. Such a kernel generally had complete access to the data of a storage device and would cause duplicate file operations to be performed for file operations to a preselected drive. Such control of the mirrored file system could be provided because of the close linkage between the proprietary operating system and the file mirroring kernel.

Furthermore, because of the purpose-specific nature of the proprietary operating system, a simple file access system could be provided with minimal concerns for security and control of access to files by behaved processes. However, in a more general purpose environment, such as systems utilizing general purpose multi-user operating systems such as WindowsNT from Microsoft Corporation, Redmond, Washington or Unix, AIX from International.Business Machines Corporation, Armonk, N.Y., Solaris from Sun Microsystems, Palo Alto, Calif. or Linux, concerns over security and file access may make the mirroring of files more complex.

Files in such general purpose systems generally have a set of permissions associated with them which are controlled by an "owner" of the file. The owner is, typically, the user or process which created the file. The set of permissions may be quite complex and vary from file to file. For example, certain of these permissions may make a file "invisible" or undetectable to other users or processes which do not have the appropriate set of permissions. As such, a mirroring process may be unable to detect the presence of certain files or be unable to read files in order to mirror the file to a secondary storage device. Also, the owner of a file may change its permissions and, thus, make a file which was once detectable, undetectable.

As described above, on a general purpose operating system, a mirroring process executing on a primary system may be unable to detect or read files if it does not have the proper set of permissions to access the files. Thus, the mirroring process may be unable to mirror the files from the primary data storage device to a secondary data storage device. Furthermore, a failure to mirror such files may be difficult, if not impossible, to detect prior to occurrence of a failure as the mirroring process may have no indication that a file exists and, therefore, may not know that it has failed to mirror the file. Such a failure to mirror critical files may be catastrophic in a system failure condition where operations are transferred to a data processing system associated with the secondary storage device. In such a case, the files needed to resume operations may be missing and the transfer of operations may be impossible.

In light of the above discussion, a need exists for improvements in file mirroring systems.

SUMMARY OF THE INVENTION

Embodiments of the present invention include methods, systems and computer program products which may provide access to files which are mirrored between at least a first storage device and a second storage device by determining if an access of the first storage device is by a process for mirroring files between the first storage device and the second storage device and assuming a privileged user level for the process for mirroring files so as that the access to the first storage device is performed at the privileged user level if the access is by the process for mirroring files. By assuming a privileged user level, the process for mirroring files may have access to the files to mirror, preferably, irrespective of the permissions assigned to a file by the owner of a file.

Furthermore, such access may be selectively provided so that the privileged user level is only provided to the process for mirroring files if the access is of a file to be mirrored. Thus, the assumption of a privileged user level may provide access to the files which are to be mirrored without privileged user access being provided for all files.

In particular embodiments of the present invention, the process for mirroring files may be registered with a file access system associated with the first storage device. The privileged user level for the process for mirroring files may then be assumed if the access is by the process for mirroring files and the process for mirroring files is registered.

In still further embodiments of the present invention, an access type associated with the access to the first storage device may be determined. The privileged user level may then be selectively assumed for the process for mirroring files based on the type of the access to the first storage device and if the access is by the process for mirroring files.

Furthermore, the assumption of the privileged user level may be accomplished by determining if a communication with a file system associated with the first storage device is from the process for mirroring files. A user level for the communication may then be set to the privileged user level if the communication is from the process for mirroring files. Thus, in particular embodiments, the communication with the file system associated with the first storage device may be intercepted and the communication modified so as to include a specification of the privileged user level so as to provide a revised communication. The revised communication may be forwarded to the file system associated with the first storage device.

In particular preferred embodiments of the present invention, a user level field of a data structure associated with the communication may be set to specify a root user level, such as 0.

In still further embodiments of the present invention, the first and second storage devices may be associated with a general purpose multi-user operating system. In such a case, the privileged user level may have a set of file access permissions associated with a user of the general purpose multi-user operating system. Preferably, the general purpose multi-user operating system is a Unix-type operating system. In particular, the Unix-type operating system may be Unix, AIX, Solaris and/or Linux.

In distributed embodiments of the present invention, the first storage device may be associated with a first data processing system and the second storage device may be associated with a second data processing system different from the first data processing system.

In still further embodiments of the present invention, a file mirroring system is provided. The file mirroring system may include a primary storage device, a mirrored storage device and a file system configured to control the primary storage device. A mirror process associated with the primary storage device may be configured to mirror files from the primary storage device to the mirrored storage device. A file access kernel may be configured so as to intercept communications with the file system, replace a user level associated with intercepted communications from the mirror process with a privileged user level and provide the communication with the replaced user level to the file system to access the primary storage device. The file access kernel may be further configured to selectively replace the user level of a communication from the mirror process.

In further embodiments of the file mirroring system, the primary storage device is part of a first data processing system and the mirrored storage device is part of a second data processing system. The file system may also be a file system of a general purpose multi-user operating system. The general purpose multi-user operating system may be a Unix-type operating system.

While the invention has been described above primarily with respect to method aspects of the invention, both systems and/or computer program products are also provided.

DETAILED DESCRIPTION OF PREFERRED EMBODIMENTS

Figure 1:
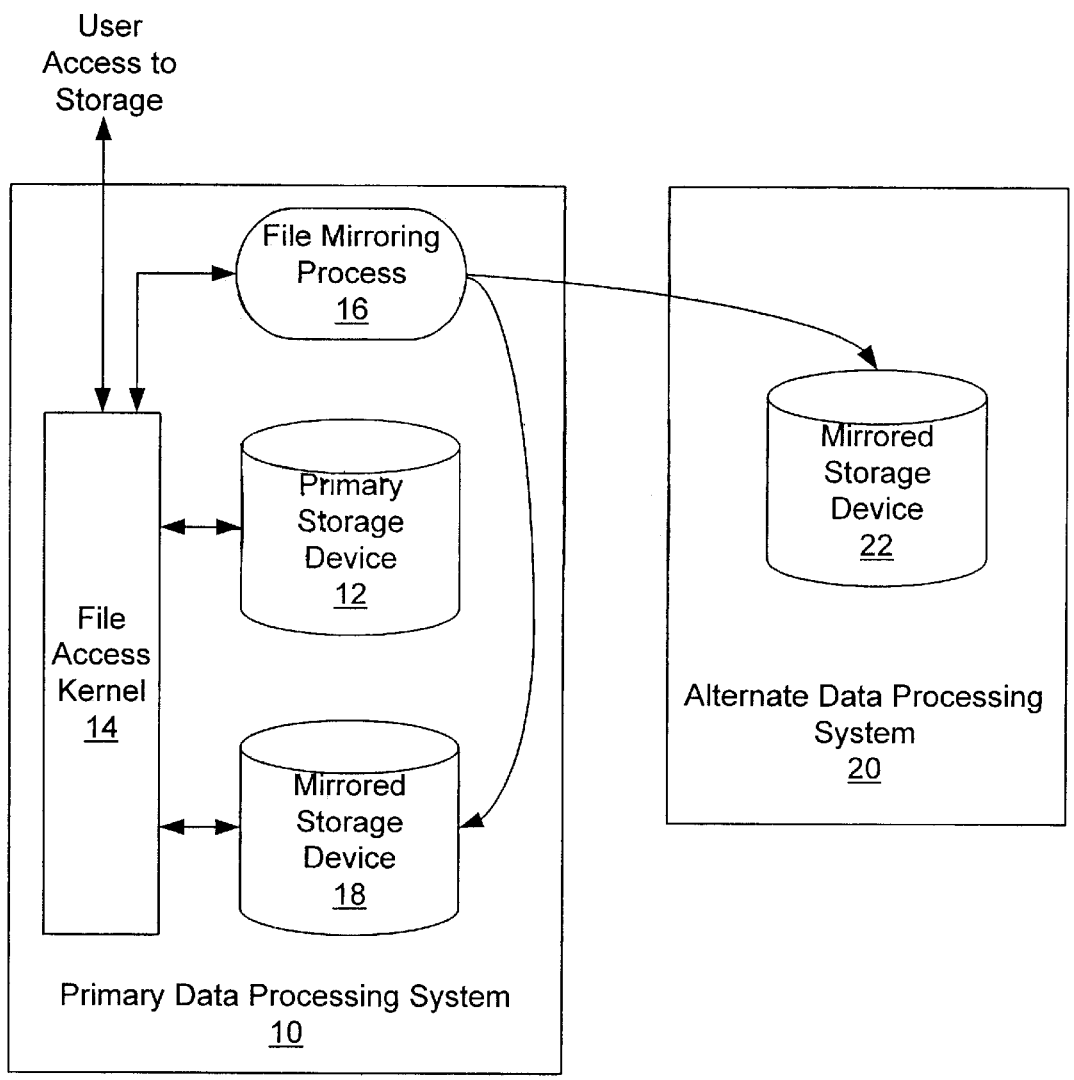
FIG. 1 is a block diagram of a file mirroring system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function(s) specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides mirrored file access by a file mirroring process temporarily assuming a privileged user level so as to assure that the file mirroring process has at least read access to the files to be mirrored. After the file mirroring operation is completed, the user level of the file mirroring process returns to its normal user level. Preferably, the file mirroring process assumes the root user level. Various embodiments of the present invention will now be described with reference to FIGS. 1 through 5.

Referring now to FIG. 1, a file mirroring system according to embodiments of the present invention is illustrated. As is seen in FIG. 1, a primary data processing system 10 has associated with it a primary storage device 12. The primary data processing system 10 also may have a file access kernel 14 or other file access program, subroutine or process which receives access attempts by users for the primary storage device 12. The primary data processing system 10 may also have a file mirroring process 16 which may perform a mirroring function so as to replicate files stored on the primary storage device 12 on a secondary storage device, such as the mirrored storage device 18 located at the primary data processing system 10 or, alternatively, to a mirrored storage device 22 associated with an alternate data processing system 20.

Generally, the file access kernel 14 or the file mirroring process 16 monitors the primary storage device 12 so as to detect file operations to the primary storage device 12 which modify files/directories which are replicated such as, for example, write, create, delete, and make_directory operations or the like. As used herein, the terms file operation or file communication refer to any operation against a file, directory, or extension of a file or directory, such as a file/directory attribute, extended attribute, or related on disk file directory structures, etc. These operations are then replicated to at least one of the mirrored storage devices 18 and 22. Which operations are replicated may be based on the drive being written to, the location on the drive being written, to the file being written, or the user writing the file. For example, only certain directories may be replicated. Thus, the file mirroring process 16 may mirror some or all of the files stored on the primary storage device 12.

As will be appreciated by those of skill in the art, the file mirroring process 16 may be a stand-alone application, may be provided as a kernel, such as by incorporation into the file access kernel 14, or may be part of an operating system executing on the primary data processing system 10. The file mirroring process, 16 may also be part of a device driver such as, for example, a device driver for the primary storage device 12.

As described briefly above, the file mirroring process 16 temporarily assumes a privilege user level which assures it the ability to read files for mirroring. The file access kernel 14 detects file access operations from the file mirroring process 16 and modifies the user level of those operations to the privileged level and passes the operation on to the file storage system which controls the primary storage device 12. As used herein, the term "user" refers to a user of a multi-user operating system or a process, application or other program which is owned by such a user. Typically, the "user" paradigm of multi-user operating systems provides a mechanism by which a set of permissions and/or authorities are associated with a process, program, application or other such data processing operation which may access files on the primary storage device 12 such that permissions of a user may be utilized to determine permissible operations or accesses for a particular file.

In particular embodiments of the present invention, the file access kernel 14 receives all accesses to a file access system associated with the primary storage device 12 and, optionally, the mirrored storage device(s) 18 and/or 22. Among other things, the file access kernel 14 may evaluate each of the accesses associated with the primary storage device 12 to determine if the accesses are by the file mirroring process 16. If so, the file access kernel 14 modifies a user level field in the data structure associated with the access so as to set the user level to a privileged user level, such as 0 for the root user level. In such a manner, the file mirroring process 16 may be assured of having access to files so as to mirror the files to a mirrored storage device, such as mirrored storage device(s) 18 and/or 22.

As will be apparent to those of skill in the art in light of the present disclosure, the functions of the file access kernel 14 may be separate from the operating system or may be incorporated into the operating system of the data processing system 10. Furthermore, the file mirroring process 16 may also be incorporated into the file access kernel 14. Accordingly, systems according to embodiments of the present invention may deviate from the configuration illustrated in FIG. 1 while still benefitting from the teachings of the present invention. While FIG. 1 illustrates a single mirrored storage device 18 on the primary data processing system 10 and a single mirrored storage device 22 on the alternate data processing system 20, the present invention should not be limited to such configurations. Embodiments of the present invention may be provided where mirroring is performed to multiple drives in a single data processing system or in multiple data processing systems. For example, where a storage device is mirrored to multiple data processing systems a network broadcast may be made of the mirroring operation, utilizing, for example, UDP messaging, so that each data processing system on the network may receive the mirroring operation and mirror the storage device to one or more storage devices local to the receiving data processing system. Accordingly, the present invention should not be construed as limited to the configuration of mirrored or mirroring drives or data processing systems illustrated in FIG. 1.

Furthermore, as used herein, the term storage device refers to all or part of a single physical storage device or all or part of multiple physical storage devices. Thus, for example, a storage device may be all or part of an output media such as CDROM, fixed disk, diskette, tape or other storage device or a partition or combination of output media such as a DOS compatible disk partition or a Unix compatible file system.

Figure 2:
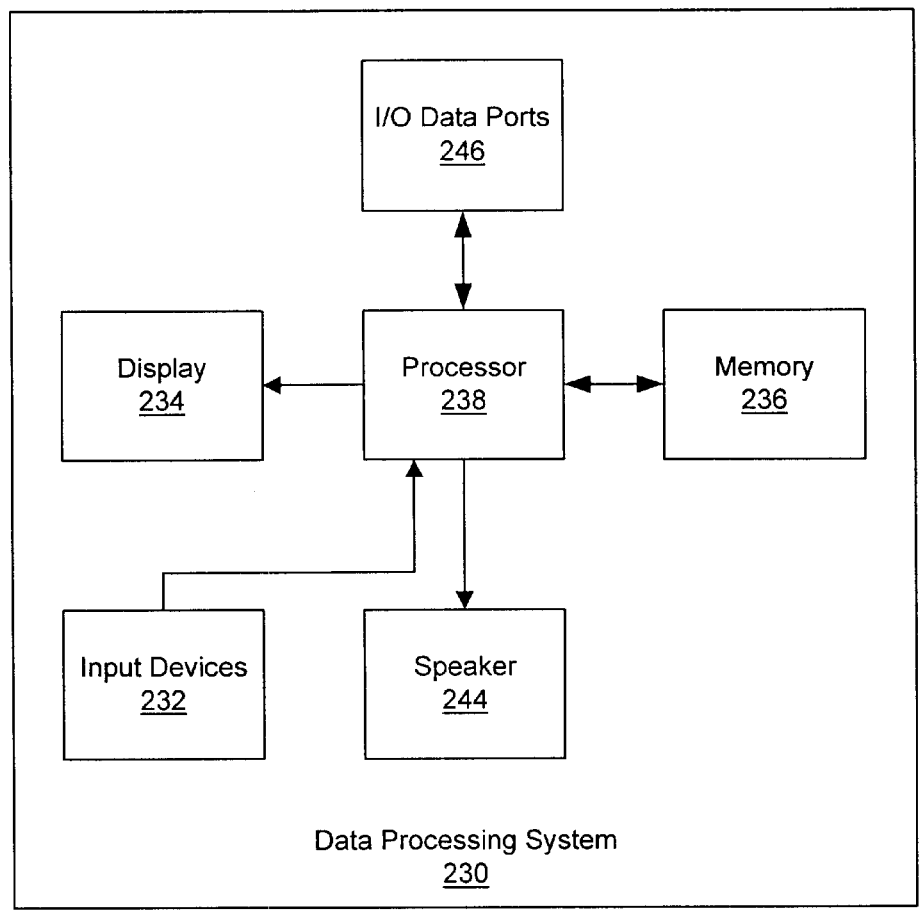
FIG. 2 is a block diagram of a data processing system suitable for use with the present invention.

An exemplary embodiment of a data processing system 230 suitable for use as either the primary data processing system 10 or the alternate data processing system 20 in accordance with embodiments of the present invention is illustrated in FIG. 2 and typically includes input device(s) 232, such as a keyboard or keypad, a display 234, and a memory 236 that communicate with a processor 238. The data processing system 230 may further include a speaker 244, and an I/O data port(s) 246 that also communicates with the processor 238. The I/O data port 246 can be used to transfer information between the data processing system 230 and another computer system or a network (e.g., the Internet). These components may be conventional components such as those used in many conventional data processing systems which may be configured in accordance with the present invention to operate as described herein.

Figure 3:
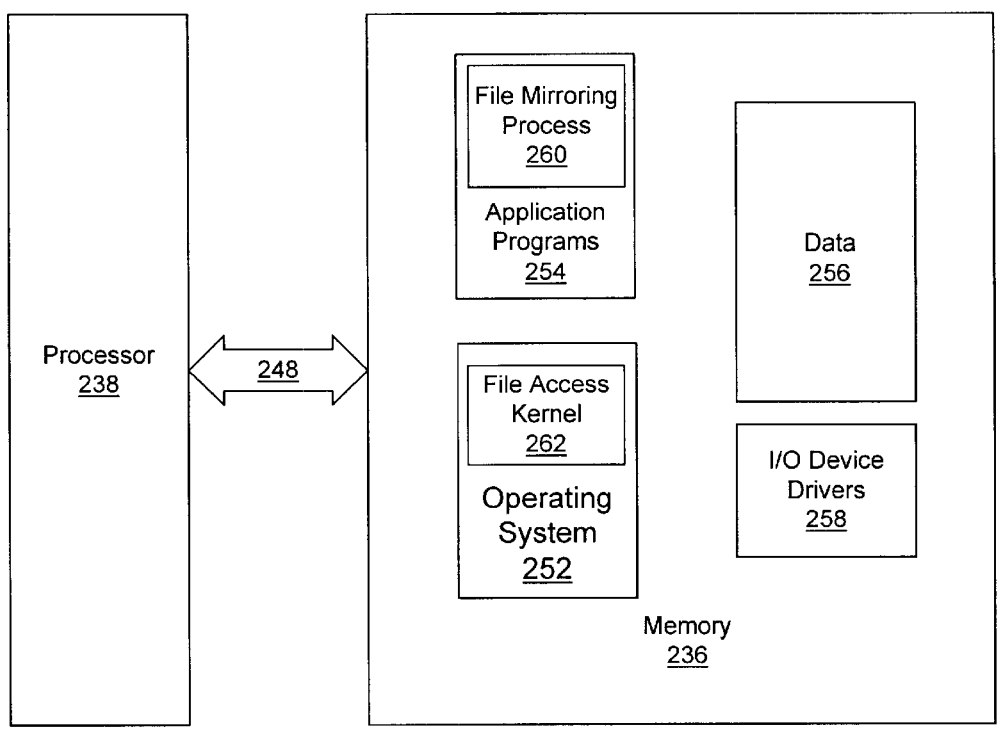
FIG. 3 is a more detailed block diagram of data processing systems according to embodiments of the present invention.

FIG. 3 is a block diagram of a data processing system that illustrates systems, methods, and computer program products in accordance with embodiments of the present invention. The processor 238 communicates with the memory 236 via an address/data bus 248. The processor 238 can be a variety of commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash, SRAM, and DRAM. As shown in FIG. 3, the memory 236 may contain several categories of software and data used in the data processing system 230: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., WindowsNT, Windows95, Windows98 or Windows2000 from Microsoft Corporation, Redmond, WA, Unix or Linux, however, the present invention may be best suited for use with general purpose multi-user operating systems such as WindowsNT or Unix-type operating systems including Unix, AIX and Linux.

The I/O device drivers 258 typically include software routines accessed through the operating system 252 by the application programs 254 to communicate with devices such as the input devices 232, the display 234, the speaker 244, the I/O data port(s) 246, and certain components of the memory 236. The application programs 254 are illustrative of the programs that implement the various features of the data processing system 230. The data 256 represents the static and dynamic data used by the application programs 254, operating system 252, I/O device drivers 258, and other software programs that may reside in the memory 236.

As is further seen in FIG. 3, the application programs 254 preferably include a file mirroring process 260 which mirrors data between at least two storage devices. The operating system 252 also. preferably includes a file access kernel 262 which temporarily alters a user level associated with the file mirroring process 260.

While the present invention is illustrated, for example, with reference to the file mirroring process 260 being an application program, as will be appreciated by those of skill in the art, the file mirroring function may also be incorporated into the operating system 252 or the I/O device drivers 258. As will be appreciated by those of skill in the art, modifications to the operation of the present invention may be needed to incorporate the assumption of the privileged user level into the operating system 252 of the I/O device drivers 258 or even into the file access kernel 262. For example, such systems may utilize methods other than process identification to determine when to assume the privileged user level. Thus, the present invention should not be construed as limited to the configuration of FIG. 3 but is intended to encompass any configuration capable of carrying out the operations described herein.

Figure 4:
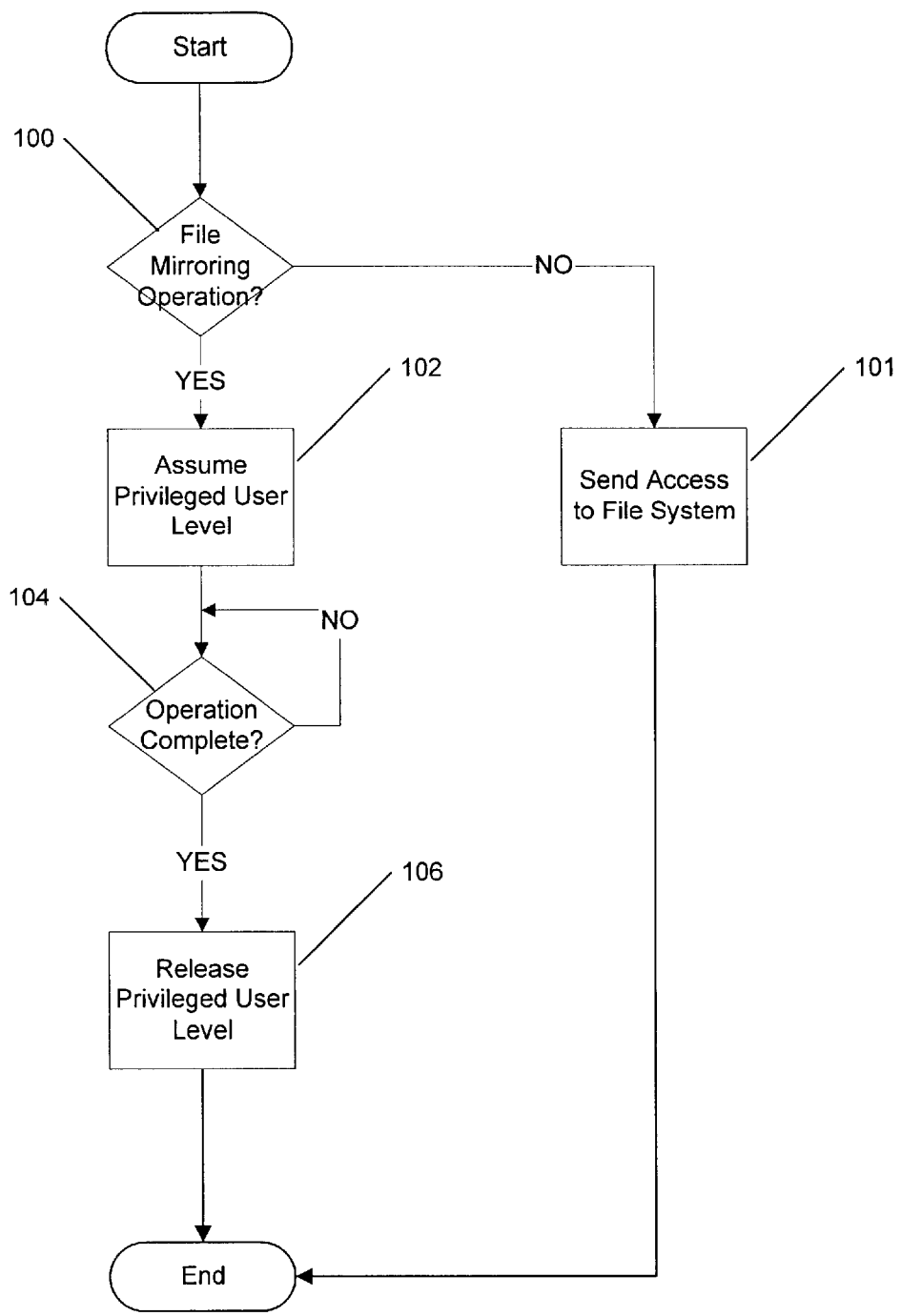
FIG. 4 is a flowchart illustrating operations according to embodiments of the resent invention.
Figure 5:
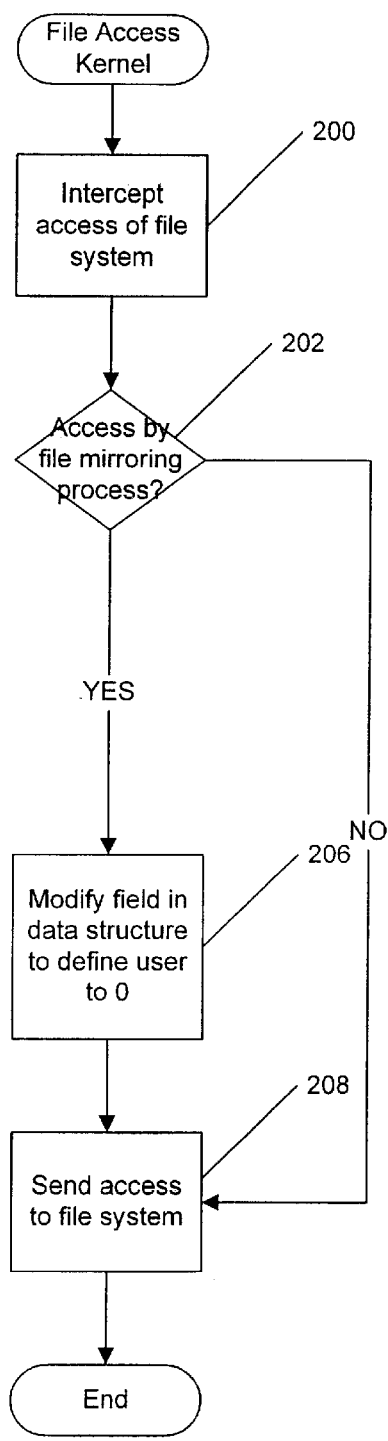
FIG. 5 is a flowchart illustrating operations according to further embodiments of the present invention.

Embodiments of the present invention will now be described in more detail with reference to FIGS. 4 and 5 which are flowchart illustrations of operations according to embodiments of the present invention. As seen in FIG. 4, it may be determined if a file access is a file mirroring operation (block 100). This determination may be made, for example, by the file mirroring process registering its process identification with the file access kernel. The file access kernel may then evaluate the process identification of a file access request to determine if the access request is from a file mirroring process. Alternatively, other flags or indicators could be incorporated into the request which indicate that the request was from a file mirroring process or application. If the file access is not a mirroring operation, the file access may be sent to the file system without assuming the privileged user level(block 101).

If the file access is a file mirroring operation, the privileged user level is associated with the file mirroring process so that the file mirroring process may assume the privileged user level for the duration of the operation (block 102). The privileged user level may be any user level which assures that the file mirroring process will have sufficient file access permissions so as to assure the ability to complete the mirroring operations. Thus, for example, in an AIX embodiment of the present invention, the user level assumed may be the root user level. Other user levels may be utilized, however, whatever user level is utilized, it should preferably be sufficient to provide read access to all files to be mirrored on the primary file storage system.

As is further seen in FIG. 4, when the file mirroring operation completes (block 104) the privileged user level may be released (block 106). Thus, the privileged user level assumed by the file mirroring process may only be assumed when needed. Accordingly, the risk of having a process at the root user level may be reduced to only those times when a file mirroring operation is being performed. FIG. 5 illustrates further embodiments of the present invention. As seen in FIG. 5, accesses to a file system are intercepted (block 200) and it is determined if the access is by a file mirroring process (block 202). As described above, this determination may be made by evaluating a process identification or other indicator in the file access. The file mirroring process may register its process identification as a process which utilizes temporary privileged user levels. Registration may be performed by registering the file mirroring process with the file access kernel by issuing an I/O Control (IOCtl) to the file access kernel which includes the process identification of the file mirroring process.

If the access is not by a registered file mirroring process, then the access is forwarded to the file system (block 208). If the access is by a registered file mirroring process, then the user level identified in the data structure accompanying the access is modified to the privileged user level, such as by setting the user level field to 0 (block 206). The access with the modified data structure is then forwarded to the file system (block 208).

While the embodiments of the present invention have been illustrated as a file mirroring system temporarily assuming a privileged user level for all file accesses, as will be appreciated by those of skill in the art, the privileged user level may be assumed for less than all of the file accesses of a file mirroring system. Thus, for example, the operations of block 202 of FIG. 5 could be modified to make further determinations as to the access of a file. For example, block 202 could be modified to evaluate the type of file operation and the privileged status only assumed for selected file operation types, such as OPEN or READ. Preferably, block 202 can be modified so that the assumption of a privileged user level could be limited to specific drives, directories on drives or files on drives. Thus, the file access operation could also be evaluated to determine if the access by the file mirroring system was of a mirrored drive, a directory on a drive or a particular file and, if so, the privileged user level could be assumed. Such identification could be provided by, for example, a setup file or other such identification which would be accessible to the file access kernel so as to identify the drives/directories/files which are to be mirrored. Accordingly, the present invention should not be construed as limited to assuming the privileged user level for all file access operations of a file mirroring system but is also intended to encompass the selective assumption of privileged user status based on characteristics of the file access operation, the file mirroring process or a combination of these characteristics.

The flowcharts and block diagrams of FIGS. 1 through 5 illustrate the architecture, functionality, and operation of possible implementations providing file mirroring according to the present invention. In this regard, each block in the flow charts or block diagrams represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or the blocks may sometimes be executed in the reverse order, depending upon the functionality involved.

In the drawings and specification there have been disclosed typical preferred embodiments of the invention and, although specific terms are employed, they are used in a generic and descriptive sense only and not for purposes of limitation, the scope of the invention being set forth in the following claims.

That which is claimed:

1. A method of providing access to files which are mirrored between at least a first storage device and a second storage device, comprising:

determining if an access of the first storage device is by a process for mirroring files between the first storage device and the second storage device;

assuming a privileged user level for the process for mirroring files which is different from a user level of the process for mirroring files; and accessing the first storage device at the privileged user level if the access is by the process for mirroring files, wherein the determining and assuming steps comprise the steps of:

determining if a communication with a file system associated with the first storage device is from the process for mirroring files; and setting a user level for the communication to the privileged user level if the communication is from the process for mirroring files and modifying the communication to include a specification of the privileged user level to provide a revised communication, and setting a user level field of a data structure associated with the communication to 0.

2. The method according to claim 1, further comprising the step of registering the process for mirroring files with a file access system associated with the first storage device; and wherein the step of assuming a privileged user level further comprises the step of assuming the privileged user level for the process for mirroring files only if the access is by the process for mirroring files and the process for mirroring files is registered.

3. The method according to claim 1, further comprising the step of determining an access type associated with the access to the first storage device; and wherein the step of assuming a privileged user level further comprises the step of selectively assuming a privileged user level for the process for mirroring files based on the determined access type of the access to the first storage device.

4. A method according to claim 1, wherein the step of accessing the first storage device comprises the step of forwarding the revised communication to the file system associated with the first storage device.

5. The method according to claim 1, further comprising the step of determining if the access is of a file to be mirrored; and wherein the step of assuming a privileged user level further comprises the step of selectively assuming a privileged user level for the process for mirroring files based if the access is of a file to be mirrored.

6. The method according to claim 1, wherein the first and second storage devices are associated with a general purpose multi-user operating system and wherein the privileged user level has a set of file access permissions associated with a user of the general purpose multi-user operating system.

7. The method according to claim 6, wherein the general purpose multi-user operating system is a Unix-type operating system.

8. The method according to claim 7, wherein the Unix-type operating system is selected from the group consisting of Unix, AIX, Solaris and Linux.

9. The method according to claim 1, wherein the first storage device is associated with a first data processing system and wherein the second storage device is associated with a second data processing system different from the first data processing system.

10. The method according to claim 1, wherein the privileged user level is a root user level.

11. A file mirroring system comprising:

a primary storage device;

a mirrored storage device;

a general purpose multi-user operating system;

a file system configured to control the primary storage device;

a mirror process associated with the primary storage device and mirror files from the primary storage device to the mirrored storage device; and a file access kernel configured to intercept communications with the file system and configured to replace a user level associated with communications from the mirror process with a privileged user level and to provide the communication with the replaced user level to the file system to access the primary storage device, wherein the user level field of a data structure associated with the communication is set to 0.

12. The system according to claim 11, wherein the primary storage device is part of a first data processing system and the mirrored storage device is part of a second data processing system different from the first data processing system.

13. The system according to claim 11, wherein the file system is a file system of a general purpose multi-user operating system.

14. The system according to claim 13, wherein the general purpose multi-user operating system is a Unix-type operating system.

15. The system according to claim 11, wherein the file access kernel is further configured to selectively replace the user level of communication from the mirror process.

16. A system for providing access to files which are mirrored between at least a first storage device and a second storage device, comprising:

means for determining if an access of the first storage device is by a process for mirroring files between the first storage device and the second storage device;

means for assuming a privileged user level for the process for mirroring files which is different from a user level of the process for mirroring files; and means for accessing the first storage device at the privileged user level if the access is by the process for mirroring files, means for intercepting the communication with the file system associated with the first storage device, wherein the means for assuming and the means for determining comprise:

means for determining if a communication with a file system associated with the first storage device is from the process for mirroring files; and means for setting a user level for the communication to the privileged user level if the communication is from the process for mirroring files, and wherein the means for setting a user level comprises means for modifying the communication to include a specification of the privileged user level to provide a revised communication, and wherein the means for setting a user level comprises means for setting a user level field of a data structure associated with the communication to 0.

17. The system according to claim 16, further comprising means for registering the process for mirroring files with a file access system associated with the first storage device; and wherein the means for assuming a privileged user level comprises means for assuming the privileged user level for the process for mirroring files only if the access is by the process for mirroring files and the process for mirroring files is registered.

18. The system according to claim 16, further comprising means for determining an access type associated with the access to the first storage device; and wherein the means for assuming a privileged user level comprises means for selectively assuming a privileged user level for the process for mirroring files based on the determined access type of the access to the first storage device.

19. The system according to claim 16, further comprising means for forwarding the revised communication to the file system associated with the first storage device.

20. The system according to claim 16, further comprising means for determining if the access is of a file to be mirrored; and wherein the means for assuming a privileged user level comprises means for selectively assuming a privileged user level for the process for mirroring files based if the access is of a file to be mirrored.

21. The system according to claim 16, wherein the first and second storage devices are associated with a general purpose multi-user operating system and wherein the privileged user level has a set of file access permissions associated with a user of the general purpose multi-user operating system.

22. The system according to claim 21, wherein the general purpose multi-user operating system is a Unix-type operating system.

23. The system according to claim 22, wherein the Unix-type operating system is selected from the group consisting of Unix, AIX, Solaris and Linux.

24. The system according to claim 16, wherein the first storage device is associated with a first data processing system and wherein the second storage device is associated with a second data processing system different from the first data processing system.

25. The system according to claim 16, wherein the privileged user level is a root user level.

26. A computer program product for providing access to files which are mirrored between at least a first storage device and a second storage device, comprising:

a computer-readable storage medium having computer-readable program code embodied in said medium, said computer-readable program code comprising:

computer-readable program code which determined if an access of the first storage device is by a process for mirroring files between the first storage device and the second storage device;

computer-readable program code which assumes a privileged user level for the process for mirroring files which is different from a user level of the process for mirroring files; and computer-readable program code which accesses the first storage device at the privileged user level if the access is by the process for mirroring files, computer-readable program code which intercepts the communication with the file system associated with the first storage device, wherein the computer-readable code which determines and the computer-readable program code which assumes a privileged user level comprises:

computer-readable program code which determines if a communication with a file system associated with the first storage device is from the process for mirroring files; and computer-readable program code which sets a user level for the communication to the privileged user level if the communication is from the process for mirroring files, and wherein the computer-readable program code which sets a user level comprises computer-readable program code which modifies the communication to include a specification of the privileged user level to provide a revised communication, and sets a user level field of a data structure associated with the communication to 0.

27. The computer program product according to claim 26, further comprising computer-readable program code which registers the process for mirroring files with a file access system associated with the first storage device; and wherein the computer-readable program code which assumes a privileged user level comprises computer-readable program code which assumes the privileged user level for the process for mirroring files only if the access is by the process for mirroring files and the process for mirroring files is registered.

28. The computer program product according to claim 26, further comprising computer-readable program code which determines an access type associated with the access to the first storage device; and wherein the computer-readable program code which assumes a privileged user level comprises computer-readable program code which selectively assumes a privileged user level for the process for mirroring files based on the determine access type of the access to the first storage device.

29. The computer program product according to claim 26, further comprising computer-readable program code which forwards the revised communication to the file system associated with the first storage device.

30. The computer program product according to claim 26, further comprising computer-readable program code which determines if the access is of a file to be mirrored; and wherein the computer-readable program code which assumes a privileged user level comprises computer-readable program code which selectively assumes a privileged user level for the process for mirroring files based if the access is of a file to be mirrored.

31. The computer program product according to claim 26, wherein the first and second storage devices are associated with a general purpose multi-user operating system and wherein the privileged user level has a set of file access permissions associated with a user of the general purpose multi-user operating system.

32. The computer program product according to claim 31, wherein the general purpose multi-user operating system is a Unix-type operating system.

33. The computer program product according to claim 32, wherein the Unix-type operating system is selected from the group consisting of Unix, AIX, Solaris and Linux.

34. The computer program product according to claim 26, wherein the first storage device is associated with a first data processing system and wherein the second storage device is associated with a second data processing system different from the first data processing system.

35. The computer program product according to claim 26, wherein the privileged user level is a root user level.

* * * * *